May 1, 1951  J. W. GORTNER  2,551,117
FIT-ALL BUSHING
Filed Nov. 25, 1946
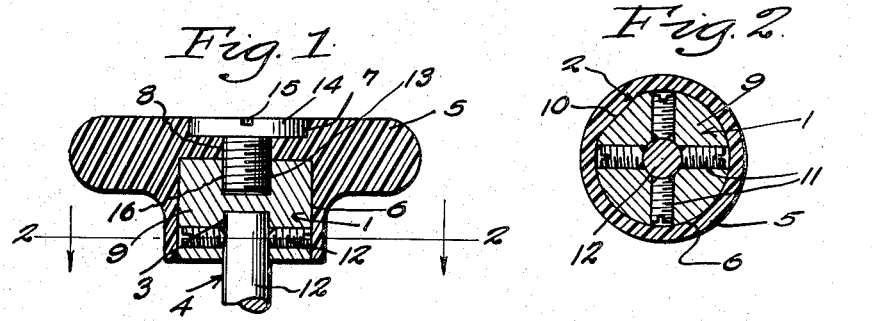
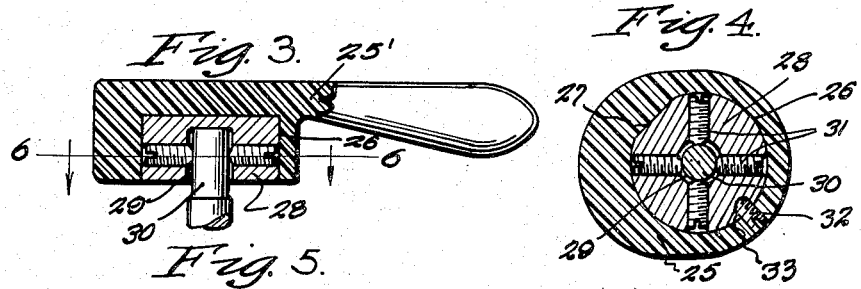
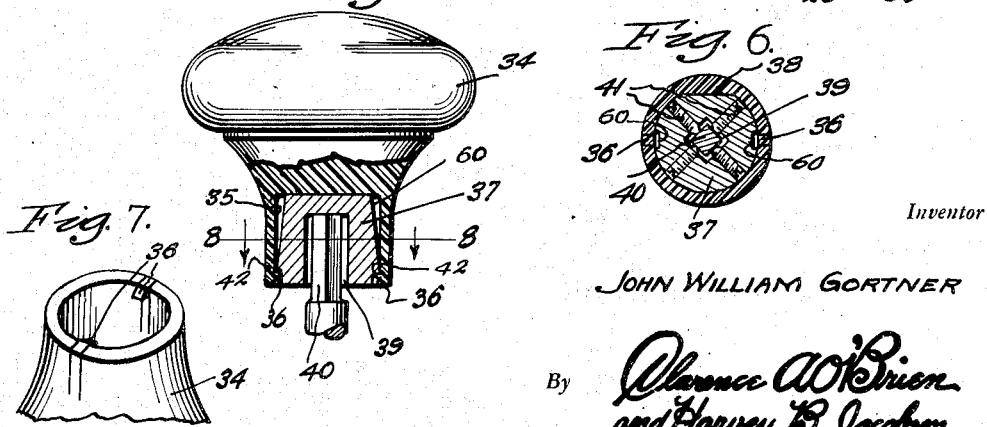
Inventor
JOHN WILLIAM GORTNER
By *Clarence A. O'Brien and Harvey B. Jacobson*
Attorneys Patented May 1, 1951

2,551,117

UNITED STATES PATENT OFFICE 2,551,117

FIT-ALL BUSHING

John William Gortner, Alexandria, Va.

Application November 25, 1946, Serial No. 712,196

3 Claims. (Cl. 287—53)

This invention relates to an improved form of fit-all bushing.

An object of the invention is to provide an improved bushing construction for connecting and attaching various forms of handles to various sizes and shapes of shanks or stems.

Another object of the invention is to provide an improved fit-all bushing which will be round in cross section except for a single flat side, the same being formed with an enlarged centrally disposed axial opening for receiving various sizes and shapes of shanks or stems, together with radially extending set screws adjustably supported in threaded radial openings formed through said bushing between its centrally disposed axial opening and its outer edge, and means for locking said bushing in said socket when inserted therein.

A further object of the invention is to provide an improved fit-all bushing which will provide a rigid connection between various types of handles and various sizes and shapes of shanks or stems.

Another object of the invention is to provide an improved form of fit-all bushing for various types of handles for connecting the same to various sizes and shapes of shanks or stems, said bushing being highly efficient in operation, and relatively inexpensive to manufacture and produce.

Other objects will appear as the description proceeds.

In the accompanying drawings which form a part of this application,

Figure 1 is a vertical sectional view through one type of handle with the fit-all bushing secured therein and attached to a round shank or stem;

Figure 2 is a sectional view taken on the line 2—2 of Figure 1;

Figure 3 is a side elevation partly in section through another type of handle with the fit-all bushing secured therein by a set screw and attached to a round shank or handle;

Figure 4 is a sectional view taken on the line 6—6 of Figure 3;

Figure 5 is a side elevation partly in section of another form of handle with the fit-all bushing locked therein by snap fasteners or catches on said handle and attached to a square shank or stem;

Figure 6 is a sectional view taken on the line 8—8 of Figure 5, and

Figure 7 is a perspective view of the bottom of the handle shown in Figure 5 showing the spring snap fasteners or catches used for holding the fit-all bushing within said handle.

Like characters of reference are used throughout the following specification and the accompanying drawings to designate corresponding parts.

In carrying out the invention, there is provided an improved fit-all bushing which is adapted to form the connection between various types of handles and various sizes and shapes of shanks, said bushing comprising in general a round body generally denoted by the reference numeral 1 having one or more flat sides 2, and formed with a centrally disposed axial opening 3 in its lower end for receiving a shank or stem generally denoted by the reference numeral 4.

In Figure 1 of the drawings, there is illustrated a flat handle 5 formed with a bushing receiving opening 6 in its inner end, and a recess 7 formed in its outer end having an axially disposed threaded passage or opening 8 formed between the openings 6 and 8. The fit-all bushing 9 is circular in shape and is provided with one or more flat sides 10, and is adapted to be received within the opening 6 in the inner end of said handle 5. A plurality of set screws 11 will be radially disposed through the body of said bushing 9 and will be threaded inwardly until their inner ends are firmly impinged against the outer surface of the shank or stem 12, which may be a part of any desired mechanism (not shown). A threaded screw 13 will be inserted within the opening 8 between the opening 6 and recess 7, the same being formed with an enlarged head 14 in which the kerf 15 or hot and cold indicia is formed, and said head will seat flush within said recess 7 when the screw 13 is tightly secured in the threaded upper axial opening 16 in the bushing 9 to hold the several parts in fixed position. It will be understood that any other fastening means may be employed, also the shank portion upon which the head 14 is secured may or may not be threaded.

In Figure 3 of the drawings, a further modification of a handle 25 is illustrated, the same being formed with a recess 26 in its inner end, said recess being round and having one or more flat sides 27. The fit-all bushing 28 employed with this form of handle 25 is relatively flat and is round in shape with one or more flat sides corresponding to the flat surface 27 in the recess 26 of said handle. A round axially disposed bore 29 is formed in the inner end of said bushing 28 for receiving the round shank or stem 30, the same being locked in position within said bore by means of the radially extending set screws 31 which are threaded through the bushing 28 between the bore 29 and its outer surface. The set screw 32 is provided and is threaded through an opening in the inner end of the handle 25', and is adapted to be received within a threaded bore 33 disposed in said bushing 28 intermediate to adjacent set screws 31, and on the opposite side of said bushing from its flat side, whereby the handle will be positively locked to said bushing after the bushing has been positively locked upon the shank or stem 30.

In Figure 5 a further modified form of handle 34 is shown, the same being provided with a socket 35 in its inner end, and a pair of oppositely disposed spring locking fingers or catches 36 are provided at the extreme inner end of said handle and are formed integrally therewith, as clearly illustrated in Figure 7 of the drawings. The bushing 37 employed with this form of handle is cylindrical in shape and is provided with one or more flat sides 38 which will cooperate with a correspondingly shaped flat side or sides within the socket 35 of the handle 34 when said bushing 37 is secured therein. An axially disposed square bore 39 is formed in the outer end of the bushing 37 for receiving the square shank or stem 40, the same being locked in position therein by means of the radially extending set screws 41 which extend radially through the bushing 37. The bushing 37 is also formed with the oppositely disposed longitudinal slots 60 which terminate in the locking seats 42 to be engaged by the inwardly directed ends of the locking fingers or catches 36 when the handle 34 is pushed onto the bushing 37 to snap the fingers or catches in locking engagement with the seats 42, thereby holding the handle to said bushing which has been previously locked to the shank or stem 40.

As will be seen in the several figures, the axial bores or openings in the bushings are formed somewhat larger than the shanks or stems which are received therein. This construction provides for the bushing to fit various sizes and shapes of shanks or stems, and may be used with various shapes of handles, as desired.

While the preferred embodiments of the instant invention have been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a handle having a socket formed therein, a bushing slidably inserted in said housing for secured placement flush with the open end of the socket, opposed longitudinal slots in said bushing terminating in locking recesses, spring actuated detents carried by said socket for guided engagement in the slots and locking engagement with the recesses, an axial bore in said bushing, a shank detachably received therein, radially disposed locking elements adjustably inserted in said bushing for selective locking penetration into the bore.

2. In combination with a handle having a socket formed therein, said socket having at least one flat side wall, a bushing detachably disposed in said socket and having at least one flat side wall complementary to the flat side wall of the socket, an axial bore in said bushing, frictional locking means carried by the bushing for engaging a shank detachably received in said bore, longitudinal slots in the outer surface of the bushing terminating in locking recesses, and spring-actuated locking means laterally carried by the socket and engageable in said slots for guided movement into engagement with the recesses.

3. In combination with a handle having a socket formed therein, said socket having at least one flat side wall, a bushing detachably disposed in said socket and having at least one flat side wall complementary to the flat side wall of the socket, an axial bore in said bushing for receiving a shank detachably disposed in said bore, frictional locking means for said shank, and means for securing said bushing in the socket flush with the open end of said socket, said last means includes longitudinal shoulders formed in said socket, recesses for receiving said shoulders formed in said bushing.

JOHN WILLIAM GORTNER.

REFERENCES CITED

The following references are of record in the file of this patent:

UNITED STATES PATENTS

| Number | Name | Date |
|---|---|---|
| 241,664 | Hughes | May 17, 1881 |
| 283,380 | Cooper | Aug. 21, 1883 |
| 843,052 | Weber | Feb. 5, 1907 |
| 1,526,500 | Kasch | Feb. 17, 1925 |
| 1,878,569 | Zolleis | Sept. 20, 1932 |
| 1,951,188 | Flaherty | Mar. 13, 1934 |
| 1,992,901 | McIntosh | Feb. 26, 1935 |
| 2,158,728 | Peters | May 16, 1939 |
| 2,233,962 | Rover | Mar. 4, 1941 |
| 2,306,876 | Gits | Dec. 29, 1942 |